United States Patent

Mayer, Sr. et al.

[15] 3,656,500
[45] Apr. 18, 1972

[54] CHECK VALVE

[72] Inventors: Thomas E. Mayer, Sr., Tonawanda; George Yokota, Amherst, both of N.Y.

[73] Assignee: Worthington Corporation, Harrison, N.J.

[22] Filed: May 18, 1970

[21] Appl. No.: 37,979

[52] U.S. Cl. ...................................137/271, 137/516.17
[51] Int. Cl. ...................................................F16k 15/08
[58] Field of Search ..........137/271, 516.15, 516.17, 516.19, 137/516.21, 516.23, 512, 512.1

[56] References Cited

UNITED STATES PATENTS

| 1,322,600 | 11/1919 | Nestor | 137/516.21 |
| 1,593,914 | 7/1926 | Redfield | 137/516.19 |
| 1,235,338 | 7/1917 | Lemp | 137/516.21 |
| 3,177,893 | 4/1965 | King | 137/516.15 X |

Primary Examiner—Robert G. Nilson
Attorney—Christel and Bean

[57] ABSTRACT

A check valve having a generally cylindrical valve chamber with a valve seat surface at one radial wall of the chamber and spring recesses at the opposite radial wall of the chamber. An annular plate seats against the valve seat surface and coil springs in the recesses bear against the annular plate valve to bias it to closed position. Teflon sleeve members in the spring recesses contain the springs and have notched ends which straddle the annular plate and thus locate it centrally of the valve structure. The notches have a depth to permit opening and closing movement of the plate and the sleeves are self-lubricating with respect to the plate edges, the springs disposed within the sleeve, and cylindrical members between the coil springs and the plate and slidable in the sleeves.

9 Claims, 4 Drawing Figures

INVENTORS
THOMAS E. MAYER, SR.
GEORGE YOKOTA
BY
Christel & Bean
ATTORNEYS

PATENTED APR 18 1972 3,656,500

INVENTORS
THOMAS E. MAYER, SR.
GEORGE YOKOTA
BY
Christel & Bean
ATTORNEYS

CHECK VALVE

BACKGROUND OF THE INVENTION

This invention relates to check valves of the type wherein the valving means comprises one or more annular valve plates. The valve plate or plates are disposed within a housing formed by a pair of complementary housing members conventionally referred to as a seat member and a guard member.

In such valves it is necessary to provide means for maintaining the annular valve plate or plates in a position of concentricity with respect to the valve chamber and this is most commonly accomplished by forming projecting lugs on the guard member for engaging the annular plate valve member or members peripherally to locate the same. The frictional engagement between the valve elements and the locating lugs causes substantial wear on the lugs and on the valve plates themselves. In many instances lubrication is not permissible because of possible contamination of the gaseous fluid moving through the valve. For this reason locating means comprising self-lubricating materials, such as Teflon, have heretofore been proposed.

SUMMARY OF THE INVENTION

In the valve of the present invention an annular valve plate is urged toward the seat member by a plurality of circumferentially spaced coil springs, as is conventional in the art. In the valve of the present invention cylindrical sleeves of self-lubricating material such as Teflon are inserted in the valve spring openings and preferably fit snugly so as to be accurately located and retained therein. A cylindrical spring button is interposed between the outer end of each coil spring and the adjacent face of the annular valve plate and this button is adapted to be guided within the aforesaid Teflon cylindrical sleeve and its reciprocations are thus automatically lubricated thereby.

In the valve of the present invention each self-lubricating sleeve is notched at its outer end, that is the end directed toward the annular valve plate, the notch being arcuate and of the same inside and outside radii as the inside and outside radii of the valve plate. Thus, the end of the self-lubricating sleeve straddles the valve plate and guides it and retains the same in a position of concentricity. Furthermore, the depth of the notch in the sleeve is such as to permit free opening movement of the valve, that is, movement thereof away from the valve seat surface.

While a single annular plate valve element is shown and described herein, it is to be understood that the same principles apply where multiple concentric annular valve plates are employed, as in larger valves of the general type here under consideration.

DESCRIPTION OF THE PREFERRED EMBODIMENT

Figure 1:
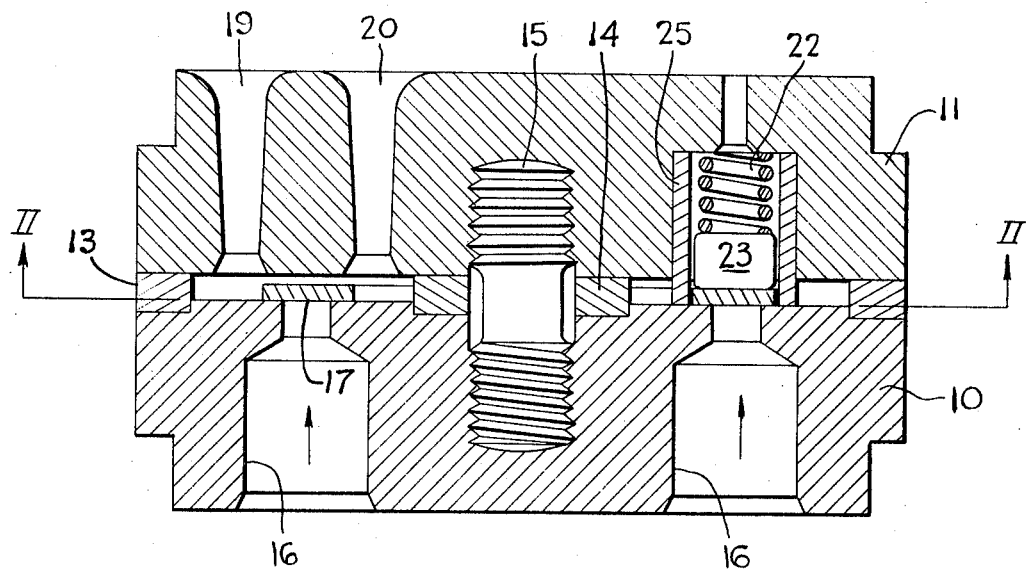
FIG. 1 is an axial cross-sectional view through one form of the valve assembly of the present invention, the upper portion thereof being taken approximately on the line 1a—1a of FIG. 3 and the lower portion thereof being taken approximately on the line 1b—1b of FIG. 3.
Figure 2:
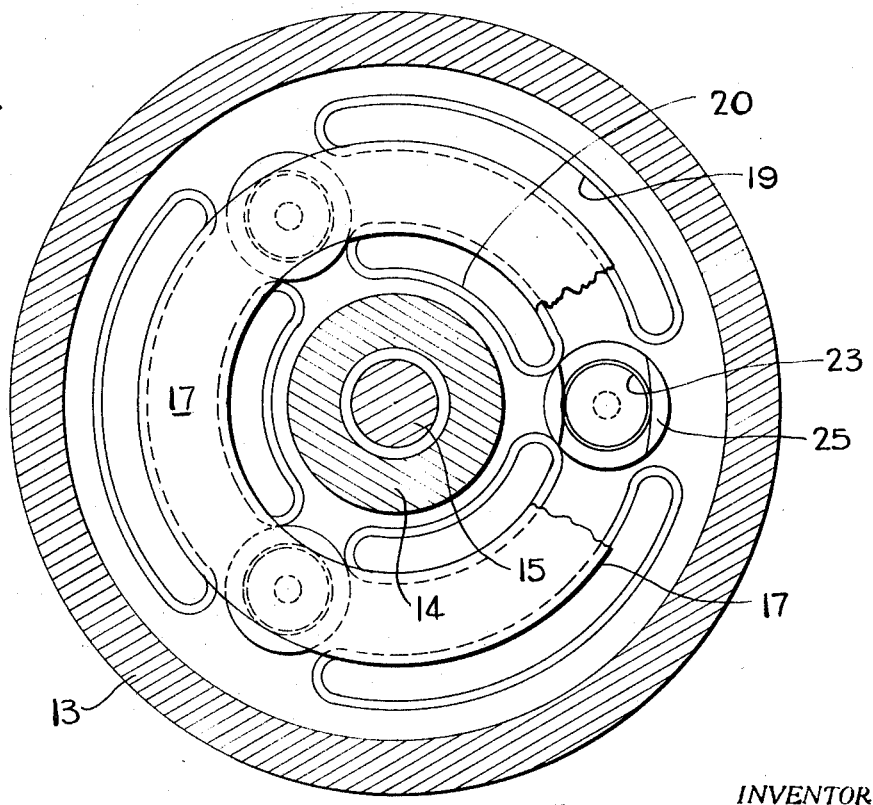
FIG. 2 is a cross-sectional view taken approximately on the line 2—2 of FIG. 1.
Figure 3:
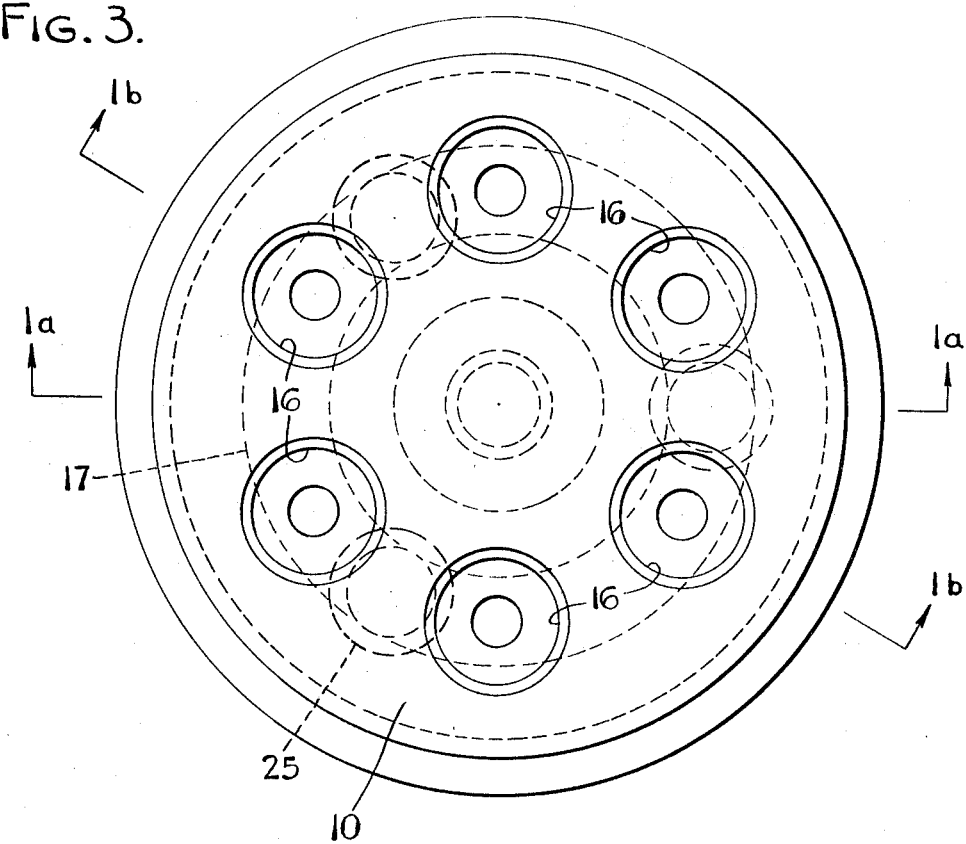
FIG. 3 is a bottom plan view of the valve illustrated in FIG. 1.

Referring to FIG. 1, the check valve unit of the preferred embodiment comprises a pair of generally cylindrical coaxial members 10 and 11 known in the art as a seat and a guard, respectively. In the present instance novel means are provided for establishing the axial extent of the valve chamber between seat and guard members 10 and 11. Such means comprises a pair of annular members 13 and 14 which are held between the members 10 and 11 and may be interchanged with annular members of various thicknesses to establish various valve chamber sizes in an axial direction. In the present embodiment a stud member 15 threads into the seat and guard members to retain them in assembled clamping position with respect to the annular members 13 and 14 which are thus securely held therebetween.

In the present embodiment fluid enters the valve structure from the bottom of the seat member as viewed in FIG. 1, as indicated by the arrows, through openings designated 16. The openings 16 are arranged circumferentially and an annular plate valve 17 seats against the upper ends of the openings to normally close the same. Novel means for retaining the valve element 17 in concentric position is provided by means of the present invention and will be described presently.

When pressure from passages 16 exceeds the biasing force of the valve seating springs, which will also presently be described, valve 17 raises and fluid flows through the valve chamber and outwardly through a plurality of arcuate slots 19 and 20 in guard member 11.

Figure 4:
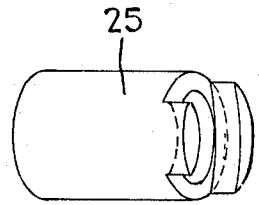
FIG. 4 is a detailed perspective view of the self-lubricative guide sleeve of the present embodiment of the valve assembly.

Valve-biasing coil springs 22 are disposed in openings in guard 11 and bear against cylindrical buttons 23 which transmit the spring force to annular plate valve 17. A cylindrical sleeve 25 of Teflon or other self-lubricating material fits snugly in each of the spring recesses as clearly shown in FIG. 1 and houses the springs 22 and houses and guides the spring button 23. The outer end of each sleeve 25, the lower end as viewed in FIG. 1, is provided with an arcuate notch or slot 26, as more clearly shown in FIG. 4. The walls of the arcuate slot 26 correspond to the inside and outside diameters of annular valve plate 17 and straddle the same to guide it accurately in its movements toward and away from seat member 10 to retain accurate concentricity of valve plate member 17 and automatically lubricate its peripheral edges which engage the walls of slot 26 in reciprocations of the valve plate. Also, the depth of the slots 26 of the several sleeves 25 is such as to permit free opening movement of annular valve plate 17 to the desired degree.

The foregoing construction provides a very simple and inexpensive guidance means for annular valve plates of the general type here under consideration. Any incidental wear due to sliding engagement between the edges of the valve plate and the surfaces of the notches of the self-lubricating sleeves will be on the sleeves rather than the valve plate, where the sleeve is of Teflon or other material softer than the metal of the valve plate. Thus such wear can be readily corrected by replacement of the sleeves of the valve. In conventional constructions wherein one of the housing members is provided with lugs for guiding the valve plates, wear on the lugs virtually destroys the entire valve structure.

Furthermore, with the valve guiding sleeves of the present invention of depth of the guiding notches in the sleeves may be varied by the use of interchangeable sleeves to vary the degree of opening movement of the annular valve plates.

The thickness of the seat and guard separating members 13 and 14 is varied along with the depth of the notch in the sleeve member 25 to vary the degree of opening movement of valve plate 17 and to vary the valve plate thickness.

While a complete and specific embodiment of the principles of the present invention is described herein and illustrated in the drawings, it is to be understood that various mechanical modifications may be made therein.

We claim:

1. A check valve comprising a housing having a chamber therein including a flat surface having a plurality of circumferentially arranged fluid pressure ports opening therethrough, an annular valve plate adapted to seat against said surface and thereby close said ports, and outlet pressure passage from said chamber, and means for biasing said valve plate toward said surface and for maintaining said valve plate in concentricity with respect to said pressure ports, said means comprising a plurality of circumferentially spaced recesses in said housing at the side of said chamber opposite to said flat surface, and sleeve members in said recesses and extending substantially to said surface, said sleeve members being held against axial movement between said surface and the bottom of said recesses and having notches in their projecting ends whereby said ends engage edge portions of said annular valve plate to retain the same against radial displacement, and coil springs in said sleeve members acting against said valve plate to urge the same toward said surface.

2. A check valve according to claim 1 wherein the depth of said notches is such as to permit free movement of said valve plate away from said surface.

3. A check valve according to claim 1 wherein said sleeve members are of lubricative material.

4. A check valve according to claim 2 wherein said sleeve members are of lubricative material.

5. A check valve according to claim 1 including cylindrical members between said coil springs and said valve plate and slidable in said sleeve members.

6. A check valve according to claim 1 wherein the notched ends of said sleeve members straddle said valve plate.

7. A valve assembly according to claim 1 wherein said housing comprises a pair of complemental housing members, an annular member disposed marginally between said housing members and a central member likewise disposed between said housing members, and means retaining said housing members in clamping engagement with said annular and central members.

8. A valve assembly according to claim 7 wherein said complemental housing members are coaxial generally cylindrical members.

9. A valve assembly according to claim 7 wherein said annular and central members are interchangeable as to thickness to provide various degrees of valve plate movement.

* * * * *